United States Patent
Gagas et al.

(10) Patent No.: US 6,194,051 B1
(45) Date of Patent: Feb. 27, 2001

(54) COMPOSITE STRUCTURAL COMPONENTS FOR OUTDOOR USE

(75) Inventors: John M. Gagas, Milwaukee; Donald H. Mullett, Hartland, both of WI (US)

(73) Assignee: Bradley Corporation, Menomonee Falls, WI (US)

( * ) Notice: Subject to any disclaimer, the term of this patent is extended or adjusted under 35 U.S.C. 154(b) by 0 days.

(21) Appl. No.: 08/892,796

(22) Filed: Jul. 15, 1997

(51) Int. Cl.$^7$ .................................................... B32B 3/06
(52) U.S. Cl. ................ 428/99; 52/263; 52/783.17; 428/45; 428/52; 428/192; 428/480; 524/399; 524/400
(58) Field of Search .................. 428/99, 192, 45, 428/52, 480; 524/399, 400; 52/783.17, 263

(56) References Cited

U.S. PATENT DOCUMENTS

| | | | |
|---|---|---|---|
| 3,780,156 | 12/1973 | Cameron | 264/300 |
| 3,827,933 | 8/1974 | Duggins et al. | 161/176 |
| 3,895,471 | 7/1975 | Kolb | 52/726 |
| 3,964,221 | 6/1976 | Berquist | 52/177 |
| 4,028,134 | 6/1977 | Stayner et al. | 106/291 |
| 4,057,450 | 11/1977 | Lee | 156/213 |
| 4,183,991 | 1/1980 | Smiley et al. | 428/220 |
| 4,273,833 | 6/1981 | Long | 428/411 |
| 4,349,297 | 9/1982 | Misener | 405/221 |
| 4,365,577 | 12/1982 | Heinrich | 114/267 |
| 4,524,043 | 6/1985 | McDougal | 264/320 |
| 4,659,255 | 4/1987 | Shiraishi et al. | 405/216 |
| 4,743,142 | 5/1988 | Shiraishi et al. | 405/216 |
| 4,821,804 | 4/1989 | Pierce | 166/367 |
| 4,983,072 | 1/1991 | Bell | 405/216 |
| 5,051,285 | 9/1991 | Borzakian | 428/36.4 |
| 5,094,567 | 3/1992 | Nista et al. | 405/227 |
| 5,180,531 | 1/1993 | Borzakian | 264/45.3 |
| 5,280,066 | 1/1994 | Tekkanat | 525/64 |
| 5,281,055 | 1/1994 | Neitzke | 405/219 |
| 5,321,055 | 6/1994 | Slocum | 523/171 |
| 5,342,554 * | 8/1994 | McBain | 523/466 |
| 5,412,915 | 5/1995 | Johnson | 52/177 |
| 5,794,402 * | 8/1998 | Dumlao | 52/783.17 |
| 5,869,557 * | 2/1999 | Landru | 428/480 |

OTHER PUBLICATIONS

ECOBOARD, Advertisement on Internet, http://hamptons.goodies.com/biz/ecoad.htm, 2 pages, 1996.
Aqua–Matic Piers, Ltd., A subsidiary of the Bradley Corporation Brochure, 1996.

* cited by examiner

*Primary Examiner*—Nasser Ahmad
(74) *Attorney, Agent, or Firm*—Philip G. Meyers; Gardere & Wynne, L.L.P.

(57) ABSTRACT

A structure according to the invention comprises a series of interconnected structural members. The structural members, such as panels, are made of a composition comprising as its first essential ingredient a cured (cross-linked) resin having sufficient strength when filled as described below to support weights up to about 700 pounds without significant buckling, but which has sufficient resilience to flex and rebound from impacts such as low speed collisions with small boats or dropping of heavy human-carried objects without cracking or breaking. The cured resin matrix contains a first filler consisting essentially of inorganic particles effective to improve the impact resistance and flame resistance of the structure, and an amount of a second filler consisting essentially of fibers effective to enhance the rigidity of the structure and reduce crack propagation therein. An optional third filler consisting essentially of plastic microspheres may be added in an amount effective to reduce the weight of the panel by at least 10 % without significantly affecting the other essential properties of the cross-linked resin and first and second fillers, namely flexural strength, flame resistance, impact resistance, rigidity, resistance to crack propagation, and resistance to outdoor environments, particularly marine environments. Piers and docks made from panels of the composite of the invention provide superior performance as compared to conventional materials used to build such structures.

9 Claims, 1 Drawing Sheet

COMPOSITE STRUCTURAL COMPONENTS FOR OUTDOOR USE

TECHNICAL FIELD

This invention relates to composite plastic compositions having properties suitable for use in making components for outdoor structures, particularly marine structures such as piers and docks.

BACKGROUND OF THE INVENTION

A pier is a wharf that projects perpendicularly or obliquely from a shore, serving as a berth for boats to load and unload passengers and cargo or for extending out into the water for other purposes such as fishing, swimming, and recreation. Piers are normally constructed as a pile structure-supported platform using materials selected from steel, coated metal, aluminum, timber, pressure-treated lumber, polypropylene (from milk bottles), fiberglass, and concrete. Piers may be open-deck or housed-over, and are commonly constructed from panels, laths, or sheets assembled and joined together in series on the supporting structure.

Piers and similarly located marine structures are exposed to a wide assortment of hostile environmental conditions that lead to structural failure. Problems with the materials presently used to make piers include catastrophic failure, corrosion, excessive weight, attack by animals (such as worms eating wood), decay, leaching of toxins into the water, non-reparability, cost of manufacture, warping, splitting, brittleness, destruction by the action of waves, the ability of water to transport materials, water damage, UV degradation, chemical attack, color stability, entrapped air pockets, poor resilience (the inability of a material to take an impact without damage), delamination, harm to people, animals and plants in use, water absorption, loss of physical properties, poor stability, limited shapes and designs, costs and methods of assembly, flammability, and overall weather resistance. A material is needed which is reasonably versatile and light in weight, yet highly resistant to the marine (fresh or salt water) environment and having sufficient strength and resilience to function as a dock. The present invention addresses the problems associated with known materials used in dock and pier construction by providing a filled plastic composition having properties uniquely adapted for use in a marine or other outdoor environment.

Filled and unfilled plastic products and methods for their manufacture are well documented, but suffer from a number of problems. Many such known products use a methyl methacrylate polyester resin (acrylic and polyester-based resin) that is brittle. Others use an unsaturated polyester resin which is likewise brittle. Acrylic by itself is very brittle, and can be found in products such as Corian (Du Pont). Combining methyl methacrylate (MMA) with polyester improves UV stability and chemical resistance as compared to unsaturated polyester, but at the cost of making the end product much more brittle. Brittleness in polyester products will depend on the amount of methyl methacrylate (acrylic) used, with larger amounts of acrylic increasing brittleness. A sharp impact or drop to these products will result in a cracked or shattered part, and cracks will propagate within these products. For this reason, such brittle plastics are generally unsuitable for applications such as piers, wherein the structure must absorb occasional impacts (e.g., boats striking the side of the pier) without breaking.

Various inorganic compounds such as aluminum trihydrates (ATH), glass fibers, and glass beads have been used as fillers in products such as the polyesters discussed above. ATH imparts a good flame resistance to polyester, but must be loaded in large amounts to achieve flame resistance (50 to 60% minimum by weight is typical). ATH fillers add weight from 0.6 g/cm$^3$ to 1.35 g/cm$^3$ (37.46 lbs/ft$^3$ to 84.28 lbs/ft$^3$ for loose-to-packed density) with a specific gravity of 2.42.

Glass fibers impart good strength to a product but increase brittleness and add weight. Glass fibers also have sharp ends which can cause problems to objects that come in contact with them. In the case of a pier in which glass fibers are used, the sharp ends can puncture a foot or hand when a person is touching or walking on the pier. Glass fibers also tend to break off and splinter into a person or object. Overcoating the glass fibers is one of the steps taken to reduce this problem, but adds to cost and labor. Further, all products with such a coating over glass fibers will in time, due to wear, have glass fibers protruding from the product and thus suffer the problems discussed above.

Glass spheres or beads used as a filler provide no strength addition, but provide weight reduction and increased impact resistance. Spheres made of glass add brittleness to the product, and repeated impacts will break the spheres, thereby reducing impact strength with a loss of overall tensile strength. Since the spheres are made of glass and have a rigid nature, violent operations such as mixing the spheres at high speeds, vacuuming to remove air, and spraying the mix at high pressures cause breakage, and the benefits provided by the glass spheres are lost. Similarly, products containing glass fibers or glass microspheres as a filler are not very workable or machinable. Sawing, sanding, nailing, and screw holding are difficult due to the brittle nature of glass. Glass fillers also lack flexibility.

Materials such as recycled polypropylene and polyethylene have many problems when used for the manufacture of piers, benches and other products. These problems include low temperature embrittlement, high temperature softening, flowing and moving, thermal stability (with repeated cold and hot temperature cycling, products will lose physical properties), UV stability (exposure to sun light or UV light will degrade products, resulting in loss of physical properties, and/or loss of color), low strength (unfilled materials are soft, not rigid), and high scratchability due to the soft nature of the material. Additives such as anti-microbial agents added to the products to keep growths from forming on the surface are costly and result in a loss of physical properties.

Processing of filled plastics has been carried out by many methods that are well known. Some methods, such as hand lay-up and injection molding, are used to make piers and other products. These processing methods are expensive and can be labor intensive. Injection molding uses matched metal molds which are expensive. Hand lay-up of materials such as fiberglass is very costly due to the labor needed to make the product, and post-curing the product is needed to attain the desired physical properties. This post-curing step is time and temperature dependent, for example, 2 hours at a temperature of 180° F. or 8 hours at 120° F. is used to cure a marine structure such as a pier or boat haul.

In the casting of polyester marbles and granites, some castings require a gel coat. These gel-coated products are not homogenous, and the gel coat once removed results in a loss of physical properties such as chemical and stain resistance and strength.

In the foregoing methods of processing, entrapped or entrained air is a common problem. In hand lay-up processes, air gaps can reduce the physical properties of the product greatly. In injection molding, air can cause similar problems with physical properties. The present invention provides a composition that avoids the foregoing problems with known materials and processing methods.

SUMMARY OF THE INVENTION

A structure according to the invention comprises a series of structural members secured with suitable means that interconnect the structural members. The structural members, such as panels, are made of a composition comprising as its first essential ingredient a cured (cross-linked) resin having sufficient strength when filled as described below to support weights up to 700 pounds for a 3' by 4' panel having a thickness of 0.75" without substantial buckling (compared to 350 pounds for a comparable fiberglass-filled panel), but which has sufficient resilience to flex and rebound from impacts such as low speed collisions with small boats or dropping of heavy human-carried objects without cracking or breaking. The cured resin matrix contains a first filler consisting essentially of inorganic particles effective to improve the impact resistance and flame resistance of the structure, and an amount of a second filler consisting essentially of fibers effective to enhance the rigidity of the structure and reduce crack propagation therein. An optional third filler consisting essentially of microspheres may be added in an amount effective to reduce the weight of the panel by at least about 10 wt. % without significantly affecting the other essential properties of the structure.

According to a preferred aspect of the invention, the structure comprises a series of structural members made of a composition comprising a cured vinyl ester resin having two fillers distributed therein. The first filler consists essentially of inorganic particles effective to improve the impact resistance of the structure, and the second filler consists essentially of plastic fibers effective to increase the rigidity and crack propagation resistance of the structural members. Suitable means, such as a stainless or galvanized steel framework and fasteners, are provided for interconnecting the structural members.

Vinyl ester resins have unexpectedly proven successful at providing the foregoing characteristics when other commonly available commercial plastics, such as polyethylenes, polypropylenes and polyesters, proved unable to provide the desired strength, resilience, environmental resistance and other important properties. In a preferred form of outdoor structure of the invention, the structural members are made of a composition comprising a cured vinyl ester resin having distributed therein effective amounts of the fillers described above. The structural members or panels are preferably free of glass spheres, fragments or fibers for the reasons discussed above.

According to a further aspect of the invention, a curable plastic composition suitable for making marine structures comprises a curable vinyl ester resin and the above described two or three fillers. A preferred curable composition of the invention consists essentially of:

about 30 to 70 wt. % of a curable vinyl ester resin, to which about 0.75 to about 5 wt. % based on the total resin of a catalyst effective to cure the vinyl ester resin is added at the time of curing;

about 5 wt. % to about 70 wt. % of inorganic mineral particles;

about 0.3 wt. % to about 50 wt. % of a second, fibrous filler effective to increase the strength of the composition when the composition is cured; and optionally from about 0.3 wt. % to 1 wt. % of plastic microspheres may be added in order to reduce the weight (density) of the material.

This composition is a substantially homogeneous mixture that can be applied to a mesh or grid to provide an embedded support.

A process for making a molded structure according to the invention includes an initial step of forming a mixture comprising a curable resin having the first and second fillers distributed therein. A support is placed into a mold, and an effective amount of a curing catalyst is added to the resin mixture. The mixture is introduced into the mold so that the support becomes embedded therein. The mixture is then cured in the mold, and the cured structure is then removed. The composition of the invention can be cast into shapes as well as sprayed onto surfaces, as further described in the detailed description which follows.

BRIEF DESCRIPTION OF THE DRAWING

The invention will be described with reference to the accompanying drawings, wherein like numerals represent like elements, and.

DETAIL DESCRIPTION OF PREFERRED EMBODIMENTS

Figure 1:
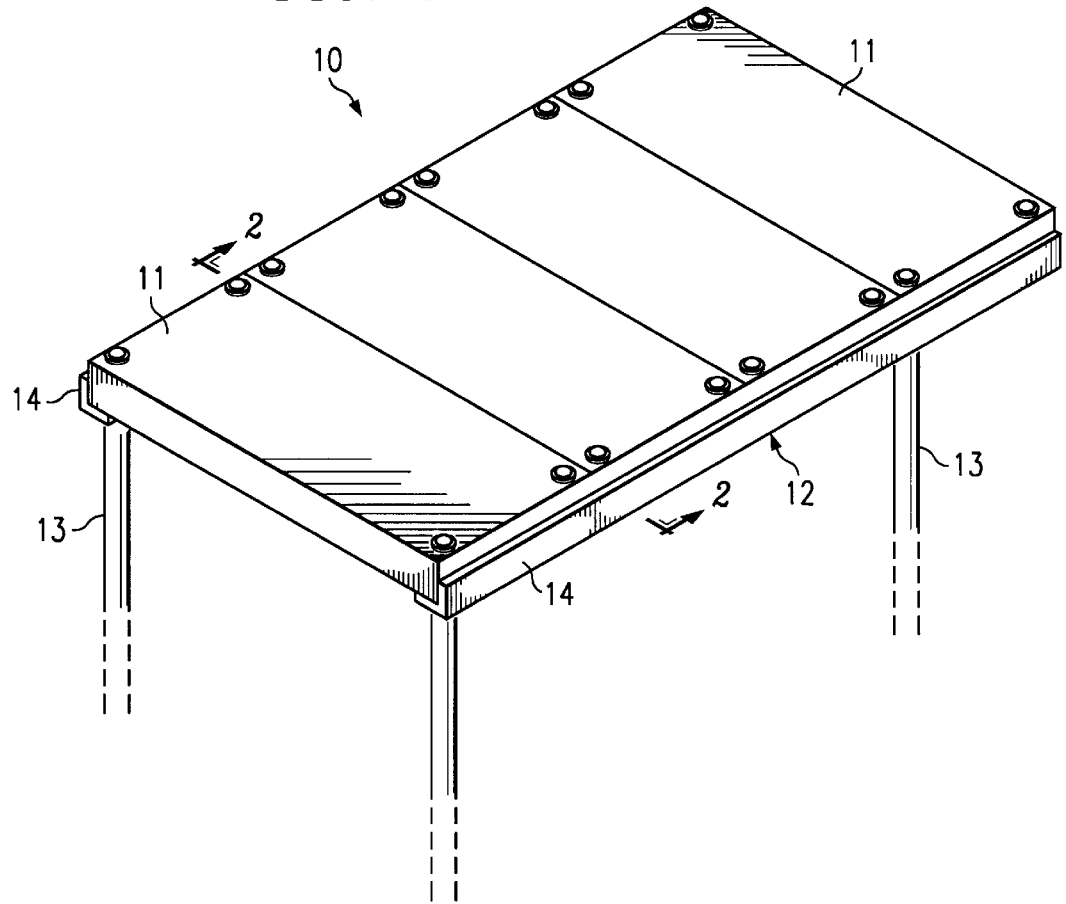
FIG. 1 is a perspective view of a pier structure according to the invention.

The invention provides a composition and process for the production of flexible homogeneous solid surface structures that can absorb and dissipate shock and impact loads without fracturing or crack propagation, and with the ability to recover their original shape. Preferred products of the invention are made from a mixture of a base vinyl ester resin containing a vinyl ester and a corresponding amount of a monomer such as styrene. The monomer preferably comprises from about 50 to 70 wt. % of the resin mixture depending on the properties desired, whereas the vinyl ester is preferably present in an amount in the range of from 30 to 50 wt. % of the resin mixture.

Vinyl esters are commonly esters of A-B-A-B epoxy resins terminating in vinyl groups, particularly acrylates thereof. A preferred vinyl ester for use in the invention is a dimethacrylate ester of a bisphenol A epoxy having the formula:

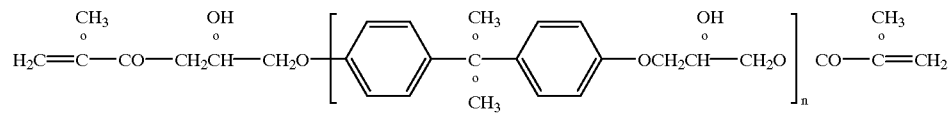

wherein n is from 1 to 3. Preferred resins include McWhorters Verimac vinyl ester 103-0636 or 184-0584 and Riechhold's Dion ver vinyl ester 31-347-00 or 31-348-00, 9100-00.

When a vinyl ester according to the invention is clear cast in the presence of the styrene monomer, the resulting plastic has a tensile strength of 12,300 psi, tensile modulus of 5.5 psi/$10^5$, tensile elongation of 6–8 %, flexural strength of 21,700 psi, flexural modulus of 5.9 psi/$10^5$, heat distortion temperature of 200° F., and Barcol hardness of 35–45. Preferred resins according to the invention have properties at least about equal to the foregoing, or not more than about 12 percent under each of the properties specified. Esters of other commercially available epoxies similar in structure to the bisphenol A-based structure shown above should provide properties suitable for use in the present invention. Vinyl ester resins are sold as a blend containing the vinyl ester together with effective amounts of a crosslinking monomer, such as styrene, a wetting agent for fibers and filler, and an air release agent. Such additives are useful for purposes of the present invention.

The amount of resin mixture, including added catalyst as described below, is preferably from 30 to 70 percent of the total batch mixture weight, most preferably 30 to 50 percent of the total batch mixture weight. Below 30% resin, the product will be too brittle, whereas above 70% resin, the cured mixture will be too flexible to hold shape with a load on it even using fibers to hold the matrix together.

A catalyst is added at the time of molding to cure the vinyl ester resin. The amount of catalyst is in the range of about 0.75 to 5 wt. % of the total resin content. An organic peroxide catalyst such as methyl ethyl ketone peroxide is preferred. Adding more catalyst provides a faster gel time. A co-catalyst such as 2,4-pentanedione peroxide can be used to provide a slower cure at a lower temperature. A higher temperature during the cure cycle time eliminates post curing and results in a near-total cure with complete crosslinking. The longer the chain formed by crosslinking, the stronger the resulting part will be. Useful peroxide catalysts include Norox MEKP-925, Norac, Inc. Hipoint 90, and Riechhold's Superox 46-750 (methyl ethyl ketone peroxide). Co-catalysts for retarding the cure time as noted above include Superox 46-709 and Superox 46-731.

The composition of the invention contains fillers effective to improve the strength, reduce the weight and reduce the overall cost of the material. A first filler made of inorganic particles of non-glass minerals such as limestone, crystalline silica, calcium carbonate fillers, and hydrated alumina functions to increase the strength of the resulting product. Preferred sizes (diameter or largest dimension) for such particles range from 8 to 75 microns. The amount of the first, inorganic filler ranges from about 5 to 70 wt. %, preferably from about 46 to 70 wt. %. Below 46 wt. % and especially below 5 wt. %, the product's ability to take an impact (sharp blow) and dissipate the energy are reduced, possibly resulting in cracking. Above 70 wt. % the amounts of the other ingredients become insufficient and the product suffers the problems noted, for example, brittleness if the amount of resin is too low. It is most preferred to make the inorganic filler content at least about 50 wt. % (defining a subrange of about 50–70 wt. %) in order to reduce the amount of resin required, which is the most costly component of the mixture.

A second, fiber-based filler is used to further improve the strength of the product. Fiber fillers can range from about 0.3 to 50%, preferably about 0.33 to 1%, of the total batch weight of the mixture. However, the higher the filler fiber loading, the thicker the mixture becomes. A large amount of fibers holds the mixture together forming a ball, and pouring becomes difficult. Plastic fibers such as polypropylene fibers are preferred, e.g., 15 denier polypropylene fibers having a 0.90–0.91 specific gravity. Such fibers preferably range from about 8 to 30 denier fineness and 0.5 to 1 inch in length. Recycled carpet fibers or virgin fibers are suitable. Polypropylene fibers are inert, durable, water insoluble, remain dimensionally stable with changes in humidity, and have high chemical, weather and abrasion resistance. Additionally, polypropylene is highly soil and stain resistant, resistant to bacterial attack, and does not support growth of mildew or fungi.

As a third filler, polymer microspheres or micro-balloons are highly preferred. The higher the percentage of polymer microspheres in the mixture, the lighter the weight of the product will be (i.e., density will be reduced.) The microspheres may be solid or preferably hollow. The microspheres are used in an amount effective to reduce the weight of the panel by at least about 10%, preferably from 20 to 30%, relative to a panel or other structural member of like composition and size but lacking the microspheres, but which amount is insufficient to substantially reduce the structural strength of the members. Such amount of microspheres that can be added generally ranges from about 0.3 to 1 wt. %, most preferably 0.33 to 0.55 wt. %. At levels above 1 wt. %, the material becomes lighter but will indent or form a hole from an impact with a sharp point such as a woman's pointed high heel shoe. Below 0.33%, the amount of the weight reduction obtained by adding the plastic spheres becomes insignificant. Suitable commercially available fillers of this type include Pierce and Stevens Polymer PVC Microspheres Dualite M6017AE-03, R. J. Marshall Company's Polyrex 1,000, or 3M Spraylite 201.

As illustrated in the examples below, several additional ingredients can be used in small amounts to further enhance the properties of the mixture. Colorants such as pigment pastes or dry color pigments can be added to change the color or look of the finished product. Such colorants include titanium dioxide ($TiO_2$) (white), carbon black (black), iron oxide ($Fe_2O_3$) and manganese oxide ($MnO_2$). These and other colorants can be added to make a solid color, a wood-like appearance, or a simulated granite or stone which can also be made by adding polyester chips with different colors to the mixture. Organic and inorganic pigments may be dispersed directly into the resin mix.

Ultraviolet UV(A and B) light absorbers, such as Ciba-Geigy's Tinuvin P, 328, or UV 9, can be added as color stabilizers that protect the product from sunlight. A flame retardant such as hydrated alumina may be added as needed. Available brands include Franklin Industrial Minerals' ATHDH-200 and R. J. Marshall's B-25X Alumina. The flame retardant can be a component of the first inorganic filler. Cured polyester polymer solids (e.g., McKee's button dust) can be added to lighten the weight of the mix and to replace more expensive materials. Effective amounts of these additives are each generally in the range from about 0.5 to 25 wt. % of the total batch mixture.

Recycled glass fibers can be added if additional strength is needed. Sources for such materials are Phoenix Fiberglass and PPG. However, use of glass fibers will have adverse side effects as discussed above, and is not preferred. Glass microspheres (3M products) can also be added, but likewise suffer the problems noted above.

The processing and dispensing for production of the composition of the invention can be by hand mixing, vacuum mixing, casting, spraying, pumping systems, vortex mixing, and low- and high-shear mixing systems. The composition can be spread, poured, gravity flowed, pumped into closed and open molds, or vacuumed into a mold, and will take the shape of what ever it is being poured into. The preferred method of mixing is vacuum mixing.

The mixture is preferably poured into an open mold with a metal expanded mesh 20 (see FIG. 2) or similar support grid supported in the middle of the mold. The mixture surrounds the mesh and bonds to the mesh material. An aluminum mesh is preferred because of its light weight, chemical resistance, and its elongation properties. Other expanded mesh metals can also be used. The final shape of the molded material will be a substantially homogenous mixture having the contours and shape of the mold in which it is poured into.

Figure 2:
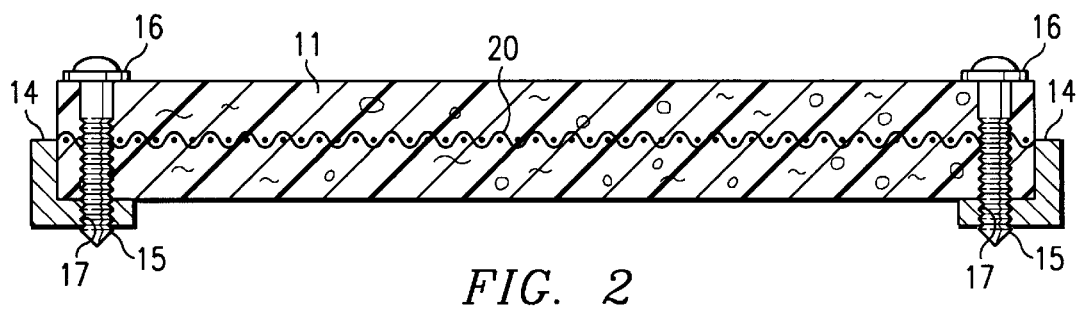
FIG. 2 is a cross-sectional view taken along the line 2—2 in FIG. 1.

FIGS. 1 and 2 show a pier 10 constructed using panels 11 made using the composition of the present invention. A support framework 12 connects a series of adjacent panels 11 to form an elevated pier. Framework 12 includes support poles or posts 13, which may be made of stainless or galvanized steel. In the embodiment shown, sides edges of panels 11 are secured to a pair of inwardly facing, L-shaped parallel brackets 14 by screws 15 provided with washers 16. Screws 15 engage holes 17 in brackets 14. Brackets 14 are rigidly secured to posts 13 by any suitable means, such as by welding or mechanical interconnection. Vertical posts 13 may alternatively be made of the filled cross-linked resin composition of the invention. Screws and washers 15, 16 may be countersunk to provide the pier or dock with a flat upper surface. Other conventional means of uniting the structural panels may also be used, such as other forms of mechanical fasteners and connectors, and cements or adhesives.

Pier 10 may be painted or provided with a protective overcoating as desired, or may be left unpainted and provided with a decorative appearance by means of decorative fillers as described above. When damage occurs, repairs can be made readily by remixing a small batch of the composite resin and applying it manually to the damaged area. The newly-molded portion will bond readily with the existing material. This ability of new material to bond to existing cured material is an important advantage of the invention.

Many of the advantages of structures built in accordance with the invention are discussed above. In addition, the ability of structures made according to the invention to resist catastrophic failure over extended periods of use is clearly essential for safety when the structure is a dock or pier that will be used by the public. On the other hand, reducing the weight of the panels by as much as 25% by means of the polymer microspheres decreases the cost of the material and reduces the labor required to build an outdoor structure. The UV stability and color stability of a panel according to the invention are better than for a comparable gel-coated fiberglass panel.

The following examples show a series of formulations for preferred compositions of the invention.

EXAMPLE 1

A total mixture batch weight of 46.2 lbs included:

18 lbs. total resins (39.24%)—103-0636 Verimac vinyl ester resin 27 lbs. of inorganic filler (58.4%)

0.33 lbs (0.714%) of Dualite M6017AE-03 polymer microspheres 0.27 lbs UV (A and B) light absorbers (0.58%)—Ciba Geigy's Tinuvin P, 328, or UV 9

0.33 lbs polypropylene fibers (0.714 wt. % Amoco Fabrics and Fibers Co., F1-CON polypropylene 15 denier, 0.75" long fibers)

0.27 lbs (0.58%) catalyst—methyl ethyl ketone peroxide (MEKP-925)

Percent amounts are by weight relative to the total batch unless otherwise noted.

The amount of catalyst is most often related to the resin. This method would relate it to 1.5 wt. % of the resin. Thus, 18 lbs. of resin times 1.5 percent equals 0.27 lbs of catalyst. 2,4-pentanedione peroxide (46-731) may be added to increase the gel time, slowing the reaction time and lengthening the total cure time cycle as needed.

Resin in an amount of 39.24 percent by batch weight of total mixture was placed in a low shear mixing system, such as a Sea-Mar or Gruber mixing system. The 103-0636 Verimac vinyl ester resin by McWhorther Technologies Inc. used in this example has 20 percent elongation, is flexible, has an intermediate viscosity, and provides increased resiliency and improved adhesion to fillers. Its viscosity is in the range of 150–450 cps, 150–200 being ideal, with a peak cure temperature of only 340 to 400° F. (peak exotherm). This resin comprises 37.1 percent styrene and gives excellent wet out and surface forming characteristics, has an excellent cycle time for curing, and can be highly filled.

To this mixture 58.44 wt. % of total batch mixture of mineral filler was added. The mineral filler in this example was hydrated alumina ATHDH 200 from Franklin Industrial Minerals Specialty, a mixture of limestone, crystalline silica, calcium carbonate, and alumina trihydrate. The UV(A and B) light absorbers were then added to the mixture, followed by the polyvinyl chloride plastic (PVC) microspheres and the polypropylene fibers. A colorant to make white products, e.g. $TiO_2$ at about 3 percent the total weight of resin, may also be added at this stage.

The total mixture was mixed for 3 minutes not under vacuum to wet the fibers and fillers, and then mixed with vacuum for 3 minutes. The catalyst, methyl ethyl ketone peroxide (MEKP-925), was then added. 2,4-pentanedione peroxide is added at this stage only if the reaction time is otherwise too fast. The resulting mixture is mixed for 3 minutes under vacuum to remove air and blend the catalyst (s), and then poured into a mold.

The catalyst overcomes the inhibitors in the resin and causes crosslinking of the resin to occur. One preferred inhibitor is tertiary butyl catechol (TBC), but other conventional inhibitors may be used. The reaction continues until the resin is completely cured. Heat is given off during the process. The reaction produces heat in the range of 180° F. to 265° F. peak exotherm.

Tests showed that the material of this example to be more than twice as strong as a fiberglass pier panel with wood inlay of comparable size. The test results were 365 lbs. load failure for the fiberglass-reinforced wood panel versus 762 lbs. load failure for the composite material of this example.

EXAMPLE 2

The following mixture was processed in the same manner as described in Example 1:

19 lbs total resins (38.9%)—103-0636 Verimac vinyl ester resin 28 lbs. of inorganic filler—hydrated alumina ATHDH 200 (57.34%)

0.345 lbs (0.706%) of Dualite M6017AE-03 polymer microspheres 0.27 lbs UV (A and B) light absorbers (0.58%)—Ciba Geigy's Tinuvin P, 328, or UV 9

0.34 lbs polypropylene fibers (same as Example 1)

0.285 lbs catalyst—methyl ethyl ketone peroxide (MEKP-925)

0.57 lbs of $TiO_2$ (colorant) (3%)

Virtually identical results to those obtained in Example 1 were obtained with the finished material, illustrating that small amounts of inert additives such as the colorant can be added without adversely affecting the properties of the composition.

EXAMPLE 3

The following mixture (total batch weight 47.145 lbs) was processed in the same manner as described in Example 1:

27 lbs total resins (57.27%)—103-0636 Verimac vinyl ester resin 18 lbs. of inorganic filler—hydrated alumina ATHDH 200 (38.18%)

0.33 lbs (0.699%) of Dualite M6017AE-03 polymer microspheres 0.27 lbs UV (A and B) light absorbers (0.58%)—Ciba Geigy's Tinuvin P, 328, or UV 9

0.33 lbs polypropylene fibers (same as Example 1) (0.699 wt. %)

0.405 lbs catalyst—methyl ethyl ketone peroxide (MEKP-925)—(0.829%)

0.81 lbs of TiO2 (colorant) (3%)

The tested results of this formula of high loaded resin resulted in a very flexible material. The load testing on a sample panel having a thickness of 0.75" showed a springboard type material with the ability to flex 6 inches in a 4 foot span without failure. Loading was 380 lbs with 6 inches of deflection. With load removed, the panel sample recovered completely, i.e., to the exact point of starting distance.

This example shows that both the composition and dimensions of a molded panel of the invention must be controlled in order to obtain the desired structural properties. For example, a 6-inch deflection would be unacceptable in a typical pier application because it would be too unsteady to walk on. The amounts of the fillers may accordingly be increased to ensure sufficient strength, or the panel could be made thicker or of reinforced design as needed to change the amount of weight it would be expected to support. The resilience shown in this example is highly advantageous for resisting impacts such as dropped objects, collisions and the like.

It will be understood that the foregoing description is of preferred exemplary embodiments of the invention, and that the invention is not limited to the specific forms shown. In particular, the composition of the invention could be used in a variety of applications both indoor and outdoor, marine and otherwise, such as sheds, boathouses, boat hauls, benches, walls, indoor ceiling panels, and the like. These and other modifications may be made in without departing from the scope of the invention as expressed in the appended claims.

What is claimed is:

1. A structure, comprising:
    a series of structural members made of a composition consisting essentially of about 30 to about 70 wt. % vinyl ester resin, and from about 5 to about 70 wt. % of a filler consisting essentially of inorganic particles effective to improve impact resistance of the structure; and
    plastic microspheres in an amount effective to reduce the weight of the structural member by at least about 10 wt. % relative to a structural member of like composition and size but lacking the microspheres, but which amount is insufficient to substantially reduce the structural strength of the members.

2. The structure of claim 1 wherein the composition from which the structural members are made contain from about 0.3 wt. % to 1 wt. % of plastic microspheres.

3. The structure of claim 1, wherein the structural members comprise substantially flat panels having a support molded therein.

4. The structure of claim 1, wherein the structure is a marine structure.

5. The structure of claim 1 wherein the structure is a pier or dock, and the structural members comprise a series of panels.

6. The structure of claim 1 wherein the members comprise a series of panels and the structure further comprises a rigid framework having surfaces configured for supporting the panels.

7. The structure of claim 6 wherein the rigid framework includes a pair of horizontal parallel brackets spaced to fit the panels therebetween, and vertical posts rigidly secured to each of the brackets for supporting the brackets in an elevated position.

8. The structure of claim 1 wherein the composition further comprises effective amounts of one or more of a UV absorber, a flame retardant, and a colorant.

9. The structure of claim 1 wherein the inorganic particles are selected from the group consisting of limestone crystalline silica, calcium carbonate and hydrated alumina.

* * * * *